Oct. 23, 1962 W. P. GALLAGHER ET AL 3,060,288

CIRCUIT CONTROLLER

Filed June 2, 1959 10 Sheets-Sheet 1

Inventors.
William P. Gallagher,
Alfred W. Gardes,
Burt V. Minard,
Anthony Dan Stolle,
By Robert R. Lockwood
atty Oct. 23, 1962 W. P. GALLAGHER ETAL 3,060,288

CIRCUIT CONTROLLER

Filed June 2, 1959 10 Sheets-Sheet 2

Oct. 23, 1962 W. P. GALLAGHER ETAL 3,060,288

CIRCUIT CONTROLLER

Filed June 2, 1959 10 Sheets-Sheet 3

Oct. 23, 1962 W. P. GALLAGHER ETAL 3,060,288

CIRCUIT CONTROLLER

Filed June 2, 1959 10 Sheets-Sheet 4

Oct. 23, 1962 W. P. GALLAGHER ET AL 3,060,288

CIRCUIT CONTROLLER

Filed June 2, 1959 10 Sheets-Sheet 7

Oct. 23, 1962 W. P. GALLAGHER ETAL 3,060,288

CIRCUIT CONTROLLER

Filed June 2, 1959 10 Sheets-Sheet 8

Oct. 23, 1962 W. P. GALLAGHER ETAL 3,060,288

CIRCUIT CONTROLLER

Filed June 2, 1959 10 Sheets-Sheet 9

Oct. 23, 1962 W. P. GALLAGHER ET AL 3,060,288

CIRCUIT CONTROLLER

Filed June 2, 1959

10 Sheets-Sheet 10

3,060,288

CIRCUIT CONTROLLER

William P. Gallagher, Coral Gables, Fla., and Burt V. Minard, Round Lake, Anthony Dan Stolle, Deerfield, and Alfred W. Gardes, Wilmette, Ill., assignors to International Register Company, Chicago, Ill., a corporation of Illinois Filed June 2, 1959, Ser. No. 817,584
16 Claims. (Cl. 200—38)

This invention relates, generally, to electric switches and it has particular relation to circuit controllers for operating a device, such as a washing machine, according to any one of several pre-selected programs.

Among the objects of this invention are: To provide for controlling the operation of a cyclically operable device such as a washing machine or the like, in a new and improved manner; to provide contacts on the juxtaposed sides of a pair of axially aligned switch plates for cooperation with switch blades extending radially from the axis of the switch plates and pivotally mounted at their inner ends; to bias the switch blades away from on switch plate toward the other switch plate; to move the switch blades selectively toward the one switch plate by means mounted on the other switch plate; to provide improved means pivotally mounting switch blades on the one switch plate, to provide improved contact means on the switch blades for engaging the respective contacts on the switch plates; to operate the switch blades by pins individual thereto that are slidably mounted on the other switch plate parallel to the axis of the switch plate; to selectively engage the pins for effecting operation of the corresponding switch blades; to provide a circular cam race on a cam plate rotatable about the axis of the switch plates, there being a cam race for each pin to operate the same; to bias the cam plate toward the switch plates with a force that exceeds the force that is applied thereto by the biasing forces applied to the switch blades; to mount the contacts on the one switch plate by resilient means; to permit the application of the entire force exerted by the biasing means individual to each switch blade to the respective stationary contact on the other switch plate; to rotate the cam plate in a stepwise manner; to tension an index spring and periodically release it to advance the cam plate; to employ a coil spring for the index spring and to connect it to the cam plate advancing means adjacent the axis of an indexing pawl that effects such advance; to provide an indexing lever arm on and extending radially from the indexing lever that carries the indexing pawl at the pivot axis of the indexing lever and to connect an operating spring to the distal end of the indexing lever arm; to employ a ratchet wheel secured to the cam plate for advancing it throuugh the movement of an indexing pawl carrying an indexing tooth that engages the teeth of the ratchet wheel; to hold the ratchet wheel against reverse rotation by a holding tooth mounted on a holding pawl; to employ common spring means for biasing the indexing tooth and the holding tooth into operative engagement with the teeth of the ratchet wheel; to mount the indexing pawl on an indexing lever and to rock the indexing lever by a cam that is rotated at a constant speed; to rotate the cam by an alternating current motor having a permanent magnet rotor likely to start to rotate in either direction; to prevent reverse rotation of the rotor to more than one revolution; to provide for manually rotating the cam plate through the agency of a rotatable shaft that is manually operable and is endwise slidable; to operate a switch from one position to another as a result of endwise movement of the shaft; to hold the shaft in either of its positions to which it is operated endwise; to employ hair pin spring means in cooperation with annular grooves in the shaft to hold it in either operated position; to mount the hair pin spring means on a back plate adjacent the ratchet wheel; to employ hair pin spring means in operation with diametrically opposite slots that are offset axially in a bushing surrounding the shaft for engaging one or the other of the annular grooves in the shaft; to position the bushing in the front plate spaced forwardly of the back plate; and to provide a resilient washer in the bushing for cooperating with the grooves in the shaft to hold it in either position.

Other objects of this invention will, in part, be obvious and in part appear hereinafter.

This invention is disclosed in the embodiments thereof shown in the accompanying drawings and it comprises the features of construction, combination of elements and arrangement of parts that will be exemplified in the constructions hereinafter set forth and the scope of the application of which will be indicated in the appended claims.

For a more complete understanding of the nature and scope of this invention, reference can be had to the following detailed description, taken together with the accompanying drawings, in which.

Figures 1, 2, 3, 4:
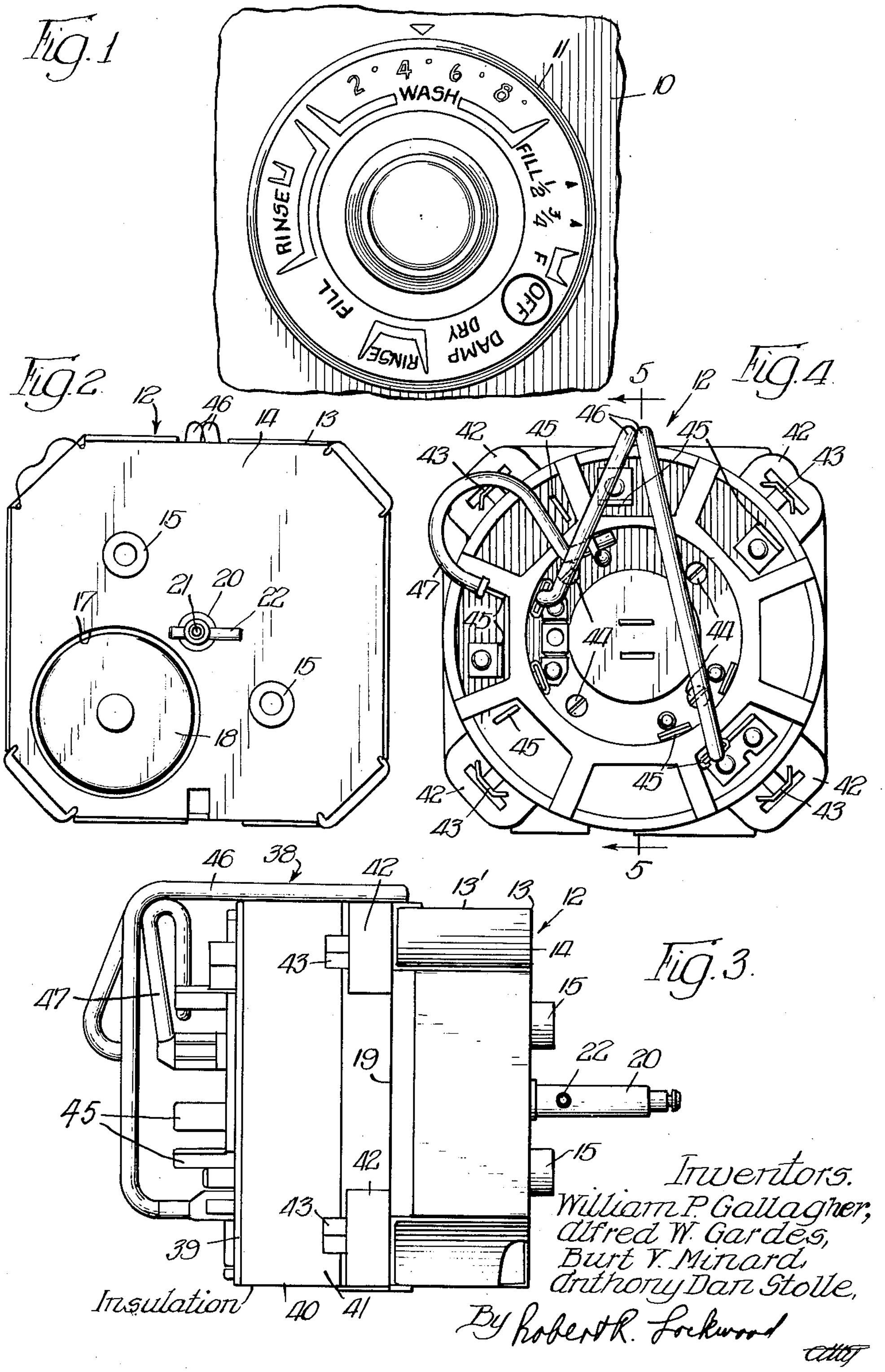
FIGURE 1 is a view, in front elevation, of a portion of panel of a device, such as a washing machine, with which the present invention can be employed and showing a typical form of dial that can be employed for setting the circuit controller.
FIGURE 2 is a view, in front elevation, of the circuit controller, dismounted from the panel, and the dial omitted.
FIGURE 3 is a view, in side elevation, of the circuit controller.
FIGURE 4 is a view, in rear elevation, of the circuit controller.

Referring now particularly to FIGURES 1 through 6 of the drawings, it will be observed that the reference character 10 designates a panel of a device, such as a washing machine, the operation of which is to be controlled so that it will perform different cycles of operation in proper timed sequence. A dial 11 is provided for rotation relative to the panel 10 and it carries indicia indicating typical cycles of operation that may be performed under the control of the circuit controller of the present invention.

Mounted on the rear of the panel 10 is a circuit controller that is indicated, generally, at 12 and in which the present invention is embodied. The circuit controller 12 is constructed in such manner as to provide the desired programming of the cycles of operation of the washing machine with which it is associated. These cycles of operation and the number of different cycles vary depending upon the particular washing machine that is controlled. There is shown herein a particular construction but it will be understood that it can be varied to provide more or less cycles in the program of operation and greater or smaller amounts of time for the performance of each cycle as may be desired.

The circuit controller 12 has a metal case 13 which is formed preferably of sheet steel and includes a front plate 14 that may be provided with bushings 15 which are internally threaded for receiving screws to hold the circuit controller 12 in place on the panel 10. The front plate 14 is provided in the lower left corner with a circular opening 17 that registers with a motor, shown generally at 18. This portion of the front plate 14 is removed in order to avoid adversely affecting the magnetic field of the motor 18. The metal case 13 also includes a back plate 19 that is formed of sheet steel and is suitably secured to the central portion 13' of the metal case 13 as by lugs struck from the central portion 13'.

Journaled centrally of the front plate 14 and back plate 19 is a manually rotatable shaft 20. The shaft 20 is arranged to rotate about an operating axis that is indicated by the broken line 21. Reference is made herein to the operating axis 21 to provide an axis of reference for the various parts making up the circuit controller 12. It is this axis to which reference is made in the claims.

A pin 22 extends transversely through the shaft 20 to provide for a non-rotatable connection between the shaft 20 and the dial 11 so that the two rotate conjointly.

The shaft 20 is not only rotatable but also it is endwise movable through a limited extent which is governed by the spacing between snap rings 23 which engage either the front side or the back side of the front plate 14 in limiting the endwise movement of the shaft 20.

Figures 5, 5A, 5B, 5C:
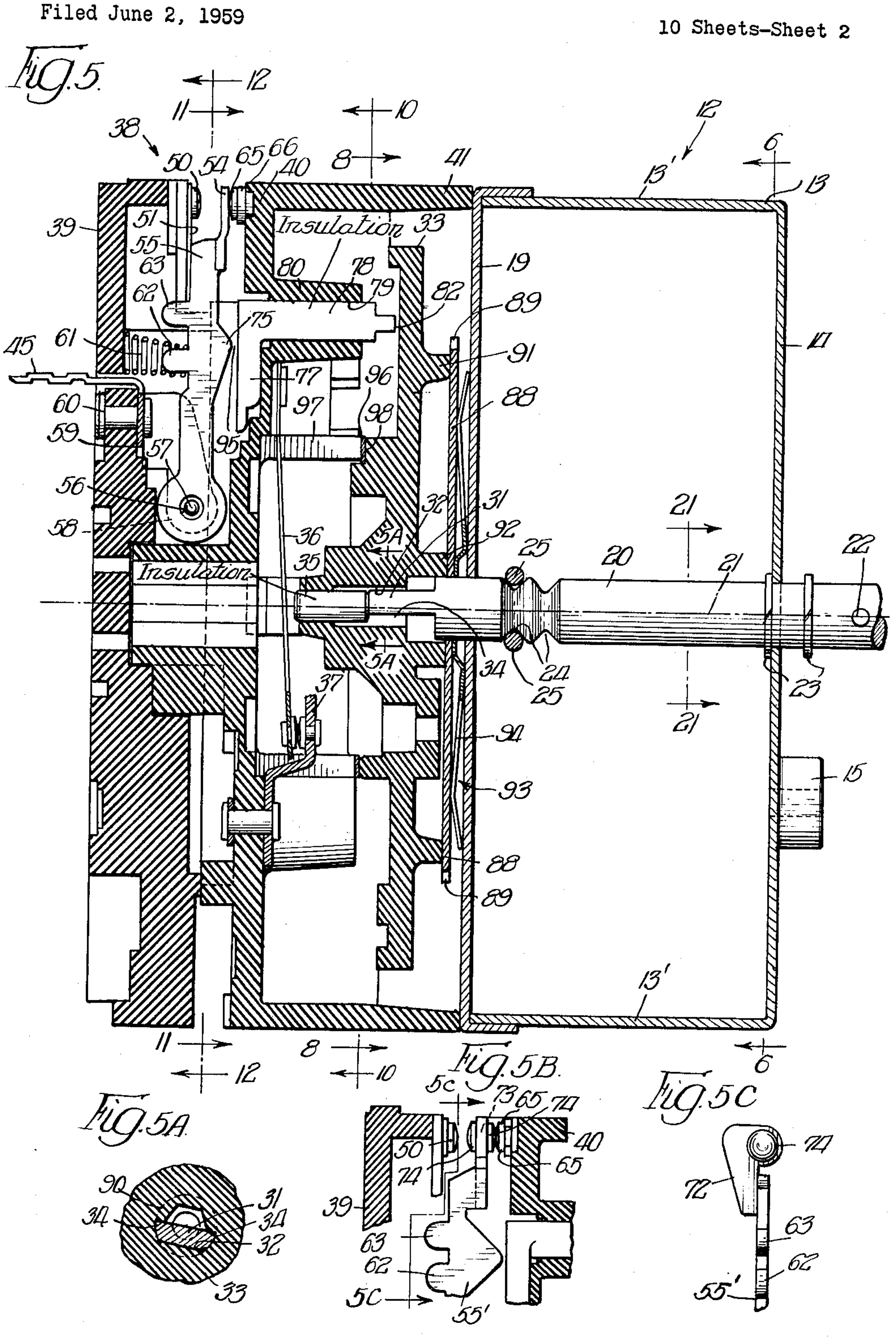
FIGURE 5 is a view, at an enlarged scale, taken generally along the line 5—5 of FIGURE 4, the gear train and indexing lever being omitted.
FIGURE 5A is a detail sectional view taken generally along the line 5A—5A of FIGURE 5 to show the manner in which the operating shaft is connected to the multiple race cam.
FIGURE 5B is a sectional view showing a modified contact construction.
FIGURE 5C is a view taken generally along the line 5C—5C of FIGURE 5B.
Figures 6, 7:
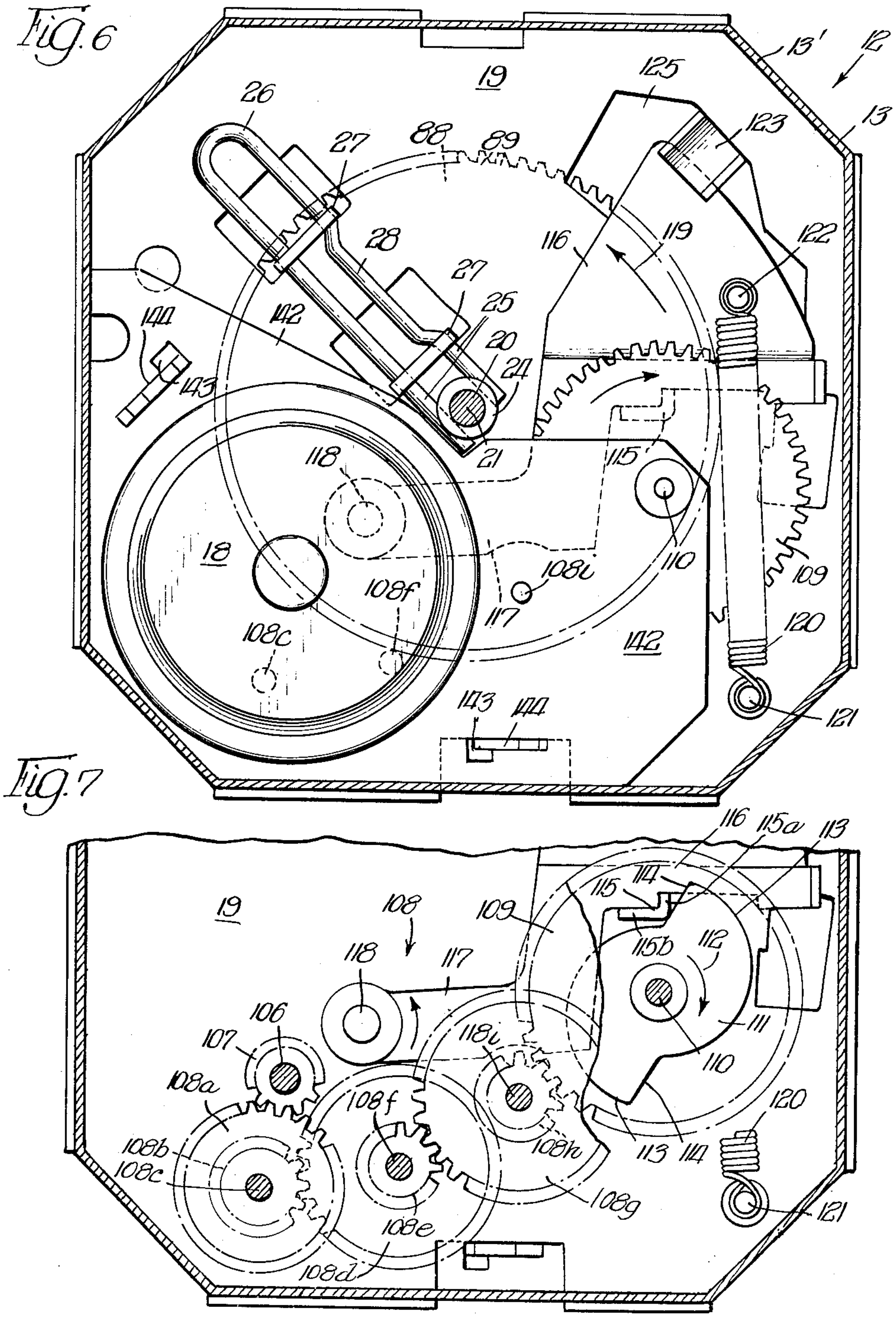
FIGURE 6 is a vertical sectional view taken generally along the line 6—6 of FIGURE 5 and showing the motor mounting and certain parts that are associated therewith.
FIGURE 7 is a view, similar to FIGURE 6, with the motor and the motor mounting plate removed in order to show more clearly the gear train and the operating cam that is driven thereby.

It is desirable that the shaft 20 be held in either of its endwise operating positions. For this purpose, as shown in FIGURES 5 and 6, annular grooves 24 are provided in spaced relation adjacent the back plate 19. Cooperating with the grooves are arms 25 of a hairpin 26. The hairpin 26 is formed of resilient material and is mounted on lugs 27 that are struck up from the back plate 19.

One of the arms 25 has an inwardly deformed portion 28 for the purpose of holding the hairpin 26 in place in notches in the lugs 27. The arms 25 of the hairpin 26 are biased toward each other and serve to grip the shaft 20 in one or the other of the grooves 24. When the shaft 20 is moved manually endwise from one position to the other, the arms 25 are spread apart and some endwise force must be applied to accomplish this. However, once the shaft 20 has been moved from one position to the other, the arms 25, because of their resiliency, interfit with one or the other of the grooves 24 and thereby act to prevent endwise movement of the shaft 20 until sufficient force is applied thereto to lift the arms 25 out of the groove 24 in which they may be located.

At its inner end the shaft 20 is provided with a flat end portion 31 one side of which bears against a surface 32 of a segment forming an integral part of a multiple race cam 33 that is formed preferably of insulating material. The construction is shown more clearly in FIGURE 5A where it will be observed that the other side of the flat end portion 31 at its ends bears against end surfaces 34 of a semi-circular portion that also is formed integrally with the multiple race cam 33. Because of the relationship between the flat end portion 31 of the shaft 20 and the surfaces 32 and 34, the shaft 20 rotates conjointly with the multiple race cam 33 regardless of whether the rotating force is applied manually through the shaft 20 or mechanically through the multiple race cam 33 in a manner to be described hereinafter. Further, this construction permits assembly of the shaft 20 with the multiple race cam 33 only in one position. This insures proper alignment between the dial 11 and the multiple race cam 33.

One reason for arranging for endwise movement of the shaft 20 is to have it operate through an insulating pin 35, slidably mounted centrally of the multiple race cam 33, a resilient switch blade 36 with respect to a stationary contact 37. As shown in FIGURE 5, when the shaft 20 occupies the position there illustrated, the resilient switch blade 36 completes a circuit through the stationary contact 37. This circuit closure can be used for controlling the operation of the washing machine. In order to stop the washing machine motor (not shown)

or some other function at any time, all that is required is to move the dial 11 and therewith the shaft 20 inwardly to such a position that the resilient switch blade 36 is moved out of engagement with the stationary contact 37.

Mounted on and to the left of the metal case 13, as viewed in FIGURE 5, is a pair of switch plates that are indicated, generally, at 38. The switch plates 38 are formed of suitable insulating material and are positioned in juxtaposed parallel spaced relation and arranged centrally of the operating axis 21 previously referred to. The switch plates 38 include one switch plate 39 that forms the rear end of the circuit controller 12 while the other switch plate 40 is interposed between the switch plate 39 and the metal case 13. An annular cam housing 41 is formed integrally with the other switch plate 40 and, as shown more clearly in FIGURE 4 of the drawings, feet 42 are formed integrally therewith for receiving lugs 43 that extend rearwardly from the back plate 19 and are bent over to hold the cam housing 41 securely in place on the metal case 13. The one switch plate 39 is held in place on the other switch plate 40 by suitable means such as four screws 44 which appear in FIGURE 4 of the drawings.

Attention is directed to the fact that the resilient switch blade 36, FIGURE 5, is mounted on the right or front side of the other switch plate 40 and that the stationary contact 37 is likewise mounted on this same member. When the shaft 20 is moved inwardly or toward the left, as viewed in FIGURE 5, the switch blade 36 is moved to open circuit position and toward the right side of the other switch plate 40.

Any suitable means can be provided for making connections to the various circuit elements to be described and carried by the switch plates 38. Conventional terminals are indicated at 45 in FIGURES 3, 4 and 5. Conductors 46 interconnect certain of the terminals 45 and the motor 18 for energizing it . A jumper 47 in the form of a conductor interconnects certain of the terminals 45. It will be appreciated that various combinations of circuit connections are available, depending upon the requirements.

Figure 12:
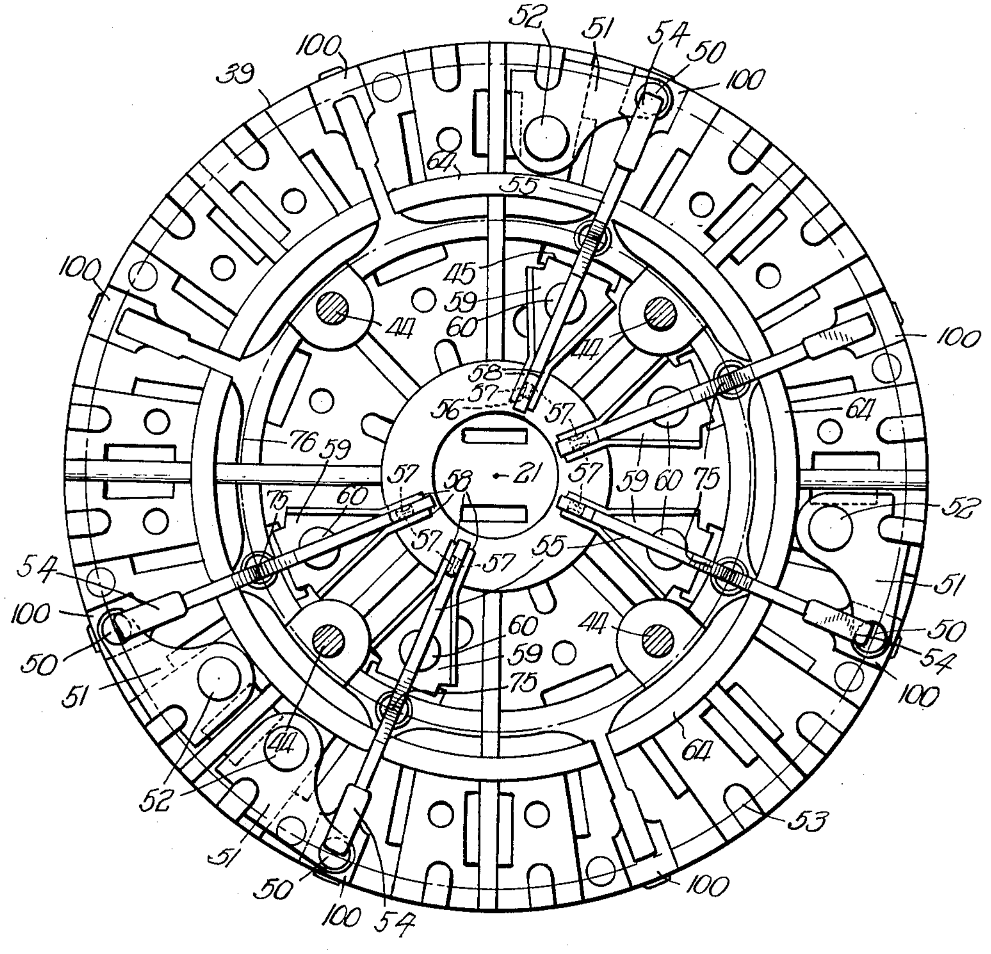
FIGURE 12 is a vertical sectional view taken generally along the line 12—12 of FIGURE 5 and showing in elevation the right side of the one switch plate together with the parts mounted thereon.

Referring now particularly to FIGURES 5 and 12 of the drawings it will be observed that the one switch plate 39 carries a number of contacts 50. Provision is made for the receipt of eight of the contacts 50 on the one switch plate 39. However, for the particular construction shown, only four are employed. For a purpose that will be more clearly apparent hereinafter each of the contacts 50 is mounted on a resilient mounting plate 51 which is secured by a rivet 52 to the one switch plate 39. It will be understood that one of the terminals 45 is secured by the rivet 52 on the opposite side of the one switch plate 39 to provide the required terminal connection. Attention is directed to the fact that the contacts 50 are located along a circle 53 the center of which is the operating axis 21 which extends centrally of the one switch plate 39.

The resiliently mounted contacts 50 are arranged to the individually engaged by flat contact plates 54 that are welded to flat switch blades 55 which extend radially from the operating axis 21. At the end of each switch blade 55 adjacent the operating axis 21 there is provided a transverse aperture 56 which is shown more clearly in FIGURE 5. Each end of each transverse aperture 56 is arranged to be engaged by a protuberance 57. The protuberances 57 are integrally formed in and struck inwardly from a pair of spaced conducting lugs 58 that are formed integrally with a central portion 59 from which a terminal 45, also formed integrally with the central portion 59, extends. A rivet 60 serves to hold each assembly in place. It will be observed that the rivet 60 extends through the central portion 59 and through the one switch plate 39. With this construction it will be observed that each of the flat switch blades 55 is pivotally mounted adjacent the operating axis 21 and that good contact engagement therewith is provided without requiring the use of a flexible shunt or other similar means. The spaced conducting lugs 58 have sufficient inherent resiliency to provide good contact engagement with opposite sides of the flat switch blade 55 and are also sufficiently resilient to permit the insertion therebetween of each switch blade 55 on assembly.

Switch blades 55 are biased away from the one switch plate 39 by coil compression springs 61. Each spring 61 reacts between the front side of the one switch plate 39 and the respective flat switch blade 55. It is guided on the latter by a lug 62. The movement of each switch blade 55 is guided by a guide lug 63 which moves in a suitable gap in a rib 64 that is formed integrally with and extends annularly around the one switch plate 39.

Provision is made, as is apparent from FIGURE 12, for receiving eight flat switch blades 55. In the particular illustration shown, only five are employed.

Each of the flat contact plates 54 carried by the respective switch blade 55 at its outer end is arranged to engage a contact 65 which is stationarily mounted on the other switch plate 40. Since the coil compression spring 61 reacts directly against the switch blade 55, and the amount of contact pressure exerted thereby between each contact plate 54 and its stationary contact 65 can be readily predetermined, it is desriable that the contacts 65 be stationarily mounted on the other switch plate 40. For this purpose each of the contacts 65 is mounted on a contact plate 66 FIGURE 11, which is carried flatwise by the rear side of the other switch plate 40 and is secured thereto by a rivet 67. It will be observed that a terminal 45 is formed integrally with each contact plate 66 and extends through a suitable opening in the one switch plate 39 to permit connection at the rear of the circuit controller 12. Attention is directed to the fact that the stationary contacts 65 are located along a circle 68 the center of which is the operating axis 21. The diameter of the circle 68 is the same as the diameter of the circle 53 along which the resiliently mounted contacts 50 are located.

In some instances it is desirable to mount some of the contacts 65 on a common support plate 69. This is shown in the lower right corner of FIGURE 11. Here two rivets 67 serve to secure the common support plate 69 in position on the other switch plate 40.

Figure 11:
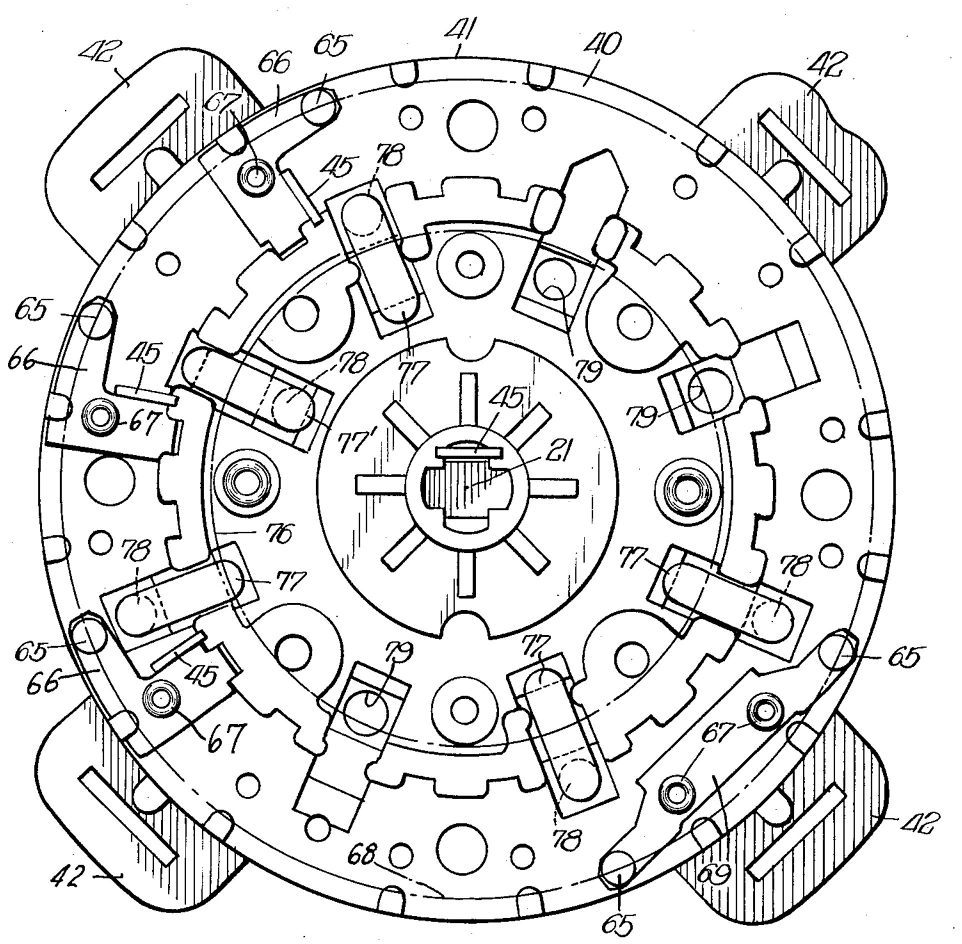
FIGURE 11 is a vertical sectional view taken generally along the line 11—11 of FIGURE 5 and showing the other side of the other switch plate in elevation together with the parts mounted thereon.

As illustrated in FIGURE 11 five stationary contacts 65 are provided, one for each of the switch blades 55 that is employed. If a larger number of switch blades is used and additional stationary contacts are required, then three additional stationary contacts can be provided if necessary.

It will be understood that the contacts 50 and 65 are formed of good conducting arc resisting material such as silver. The contact plates 51 and 66 can be formed of less expensive material such as copper or brass. Likewise the contact plate 54 is preferably formed of silver and it is secured by welding or otherwise to the outer end of the respective flat switch blade 55 which may be formed of copper or brass.

FIGURES 5B and 5C show a modified construction for the switch blade. As here shown, the switch blade 55′ is constructed in a manner similar to the flat switch blade 55 except that its outer end is provided with an integral extension 72 which is fabricated in a suitable forming machine to provide a flat contact supporting surface that is located generally at right angles to the longitudinal axis of the switch blade 55′. Instead of welding a silver contact in place as is done for the contact plate 54, a silver rivet 73 is inserted in the integral extension 72 and is provided with heads 74—74 at its ends for contact engagement with the respective resiliently mounted contact 50 and stationary contact 65.

Provision is made for moving the switch blades 55 individually away from the other switch plate 40 and against the baising forces of the respective coil compression springs 61. For this purpose there is provided an operating force receiving portion 75 intermediate the ends of each switch blade 55. As shown in FIGURE 5 this portion 75 is in the form of a protuberance and is located slightly beyond the spring 61 and away from the pivot axis of the switch blade 55 to stabilize it in the lugs 58. Also the lower side of the circular inner end of each switch blade 55 is spaced slightly from the juxtaposed bearing surface on the other switch plate 40 to prevent escape from the lugs 58. As shown in FIGURE 12 the operating force receiving portion 75 is located along a circle 76 the center of which is the operating axis 21. Thus the operating force is applied to each switch blade 55 at the same location with the result that uniform contact pressures are maintained between the resiliently mounted contacts 50 and the respective flat contact plate 54 or the head 74 at the case may be.

Figure 10:
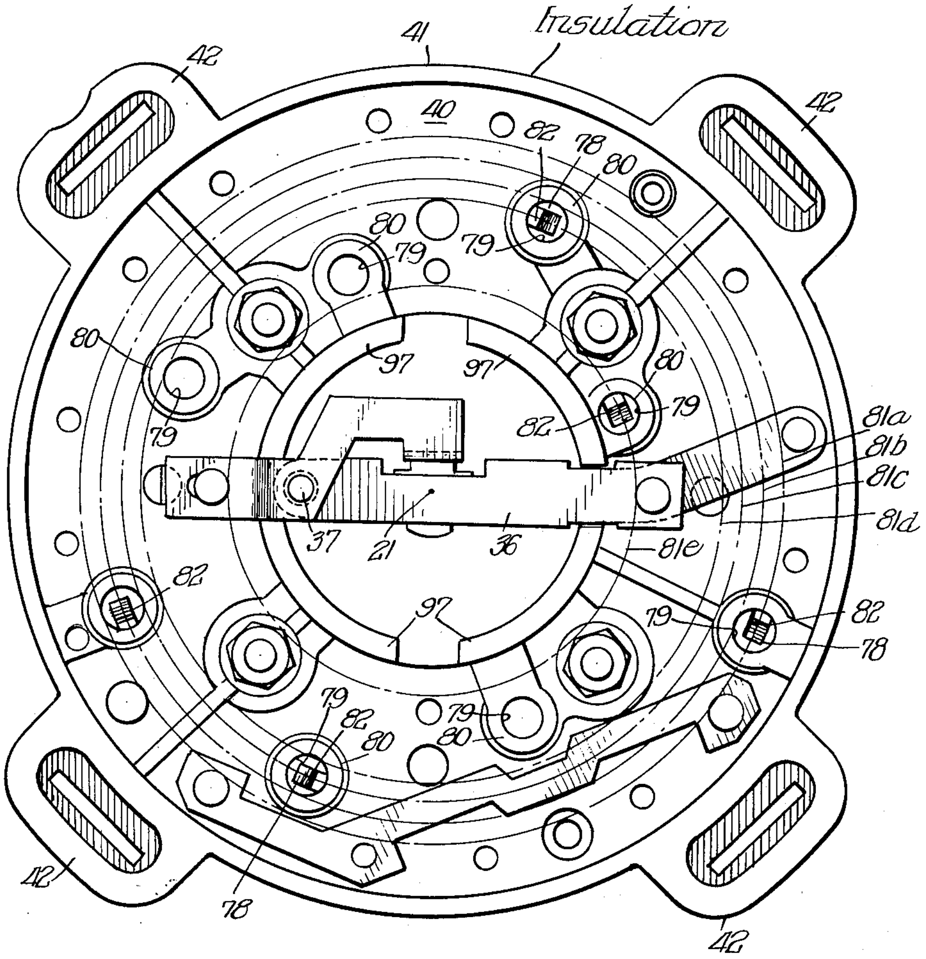
FIGURE 10 is a view taken generally along the line 10—10 of FIGURE 5, rotated 90°, and showing in elevation the inner face of the other switch plate.

Each of the operating force receiving portions 75 is arranged to be engaged individually by a head 77 that is formed integrally with an operating pin 78. Preferably the head 77 and pin 78 are formed of suitable insulating material. The operating pins 78 are slidable in openings 79 that are formed in bosses 80 that extend inwardly from the other switch plate 40 and are integral therewith. It will be observed that the operating pins 78 extend parallel to the operating axis 21. However, each of the operating pins 78 is located at a different distance from the operating axis 21. As shown more clearly in FIGURE 10 of the drawings each of the operating pins 78 is located along a circle that is individual thereto as indicated at 81*a*, 81*b*, 81*c*, 81*d* and 81*e*. These circles are concentric with the operating axis 21. While the operating pins 78 are located at different distances from the operating axis 21, because of the provision of the head 77, engagement with the operating force receving portion 75 of the switch blades 55 is readily permitted. As shown in FIGURE 11 all of the heads 77, except the head 77', extend radially inwardly toward the operating axis 21. The exception is the head 77' which extends radially outwardly. It will be understood, if eight switch blades 55 are employed, then eight heads 77 and 77' and eight operating pins 78 are employed. It will be observed that the other switch plate 40 is provided with additional openings 79 for receiving three additional operating pins, if required.

The end of each of the operating pins 78 opposite the head 77 is provided with a reduced section having an inclined surface 82. These inclined surfaces 82 at the inner ends of the operating pins 78 are arranged to have camming engagement with cam races, FIGURE 9, which are shown at 83*a*, 83*b*, 83*c*, 83*d* and 83*e*. It will be noted that these cam races 83*a–e* are located respectively along circles 84*a*, 84*b*, 84*c*, 84*d* and 84*e* the diameters of which coincide with the diameters of the respective circles 81*a–e* along which the operating pins 78 are located. When the multiple race cam 33 is rotated in the direction indicated by the arrow 85 in FIGURE 9, the cam races 83*a–e* are rotated therewith and are engaged by the inclined surfaces 82 of the respective operating pins 78. Depending upon the shape of the respective cam race 83*a–e*, the operating pins 78 are either left in the position illustrated in FIGURE 5 where the contact plate 54 engages a stationary contact 65 or a contact plate 54 may be moved out of engagement with a stationary contact 65 but not into engagement with the respective resiliently mounted contact 50 until another part of the respective cam race is engaged whereupon the contact plate 54 engages the respective resiliently mounted contact 50. The shape and extent of the respective cam races 83*a–e* can be varied depending upon the program that is desired and the switch blades 55 can be individually operated and maintained in any of three positions for as long as desired during any operating cycle.

Figure 8:
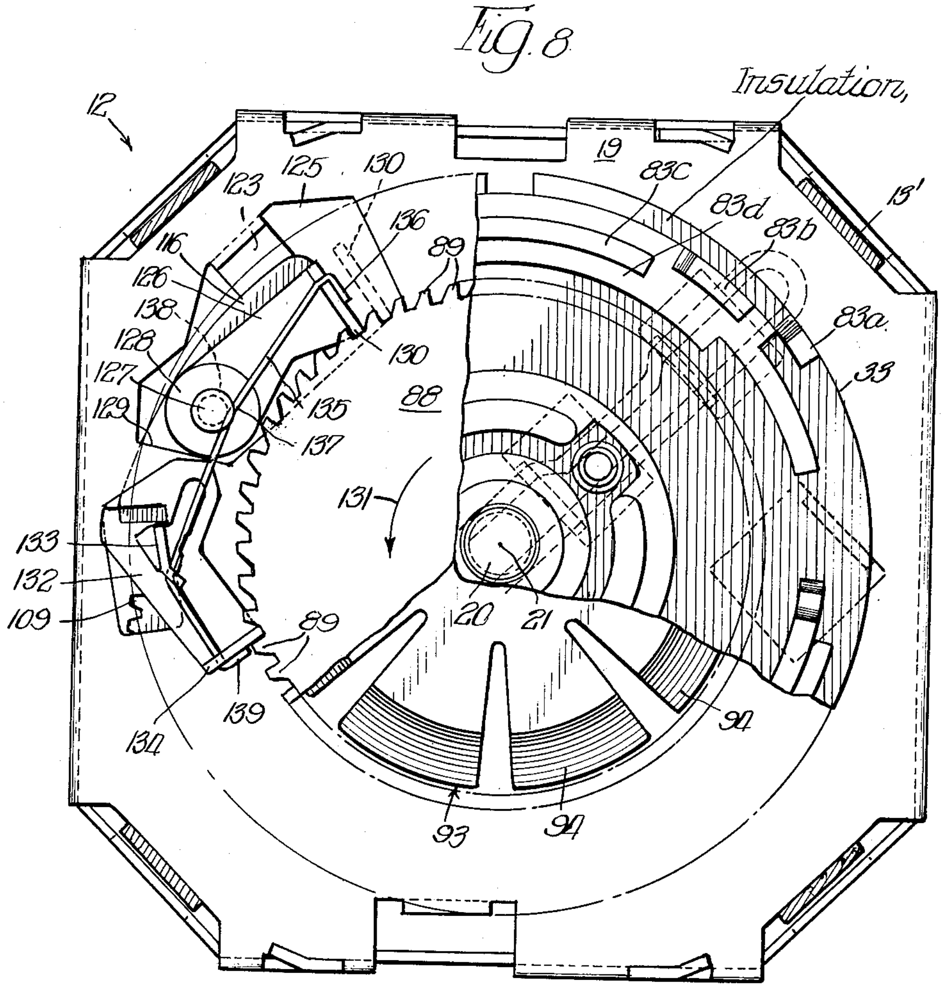
FIGURE 8 is a vertical sectional view taken generally along the line 8—8 of FIGURE 5, certain parts being broken away in order to show more clearly the ratchet wheel and operating parts associated therewith and the spring which urges the multiple race cam against the biasing forces exerted by the springs which react on the switch blades.
Figure 9:
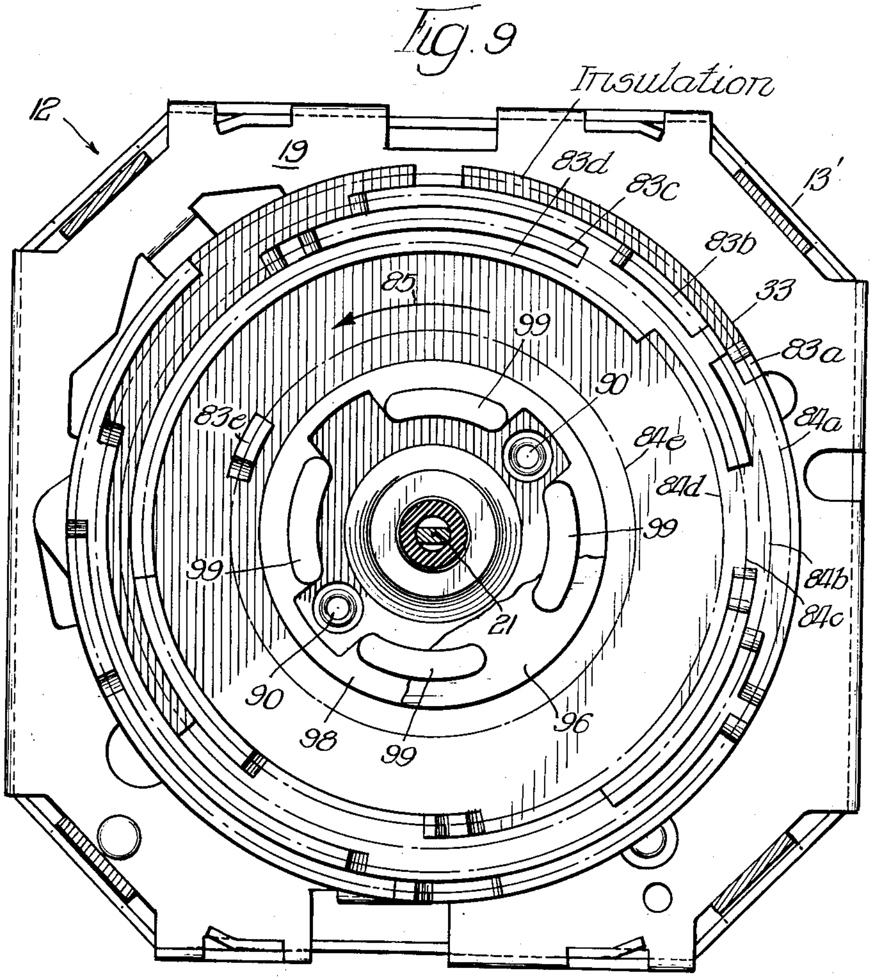
FIGURE 9 is a view, similar to FIGURE 8, showing the multiple race cam in elevation.

Provision is made for rotating the multiple race cam 33 in a stepwise fashion in the direction indicated by the arrow 85 in FIGURE 9. For this purpose a ratchet wheel 88, FIGURES 5 and 8, is used. The ratchet wheel 88 has radially extending ratchet teeth 89 which are engaged in a manner to be described hereinafter for rotating the multiple race cam 33. The ratchet wheel 88 is secured to the multiple race cam 33 by means of rivets 90 as shown in FIGURE 9. Near its outer periphery the ratchet wheel 88 bears against an annular rib 91 that is formed integrally with the multiple race cam 33. Near the center of the ratchet wheel 88 it bears against an end of a hub 92 which also is formed integrally with the multiple race cam 33.

When the operating force receiving portions 75 of the switch blades 55 are engaged by the heads 77, the springs 61 are compressed. Under these circumstances the forces exerted by the springs 61 are transmitted through the multiple race cam 33 to the ratchet wheel 88 and tend to move it toward the back plate 19 of the metal case 13. In order to oppose these spring forces a spring disc 93 is interposed between the juxtaposed faces of the back plate 19 and the ratchet wheel 88. The construction of the spring disc 93 is shown more clearly in FIGURE 8 where it will be observed it includes a number of sector shaped fingers 94 the outer ends of which, as shown in FIGURE 5, bear against the back plate 19 while a radially inwardly spaced portion bears against the juxtaposed face of the ratchet wheel 88. If desired, the position of the spring disc 93 can be reversed from that shown in FIGURE 5.

It is desirable that a gap 95, FIGURE 5, be maintained between the operating force receiving portion 75 and the respective head 77 when no thrust is applied to the respective pin 78 by the respective cam race. In order to accommodate the tolerances that are incident to manufacturing operations a spacer 96 is provided between an annular rib 97 on the other switch plate 40 and an annular shoulder 98 which is located on the multiple race cam 33. Depending upon the particular dimensions of a given run of parts, spacers 96 of different thickness can be employed in order to maintain the proper gap 95. As shown in FIGURE 9 the spacer 96 is maintained in position along the annular shoulder 98 by bosses 99 which extend therethrough. It will be understood that the multiple race cam 33 rotates relative to the other switch plate 40 which is stationary. It rotates only in the direction indicated by the arrow 85, FIGURE 9, and the inclined surfaces 82 at the inner ends of the operating pins 78 ride over the respective cam surfaces of the cam races 83*a–e*. As here indicated the leading ends of the portions of the cam races that engage the inclined surfaces 82 are correspondingly inclined for the purpose of camming the respective operating pins 78 outwardly as may be required.

It has been pointed out previously that the contacts 50 on the one switch plate 39 are resiliently mounted by the resilient mounting plates 51. As shown more clearly in FIGURE 12 of the drawings a recess or slot 100 is provided in the face of one switch plate 39 underneath the respective contact 50 and over which the resilient mounting plate 51 extends. Thus a slight movement of the contact 50 is permitted in each of the receseses 100. It is desirable that each of the contacts 50 be resiliently mounted in the manner described since the switch blades 55 are operated in the manner set forth hereinbefore. There is a relatively inflexible driving connection to each switch blade 55 from the multiple race cam 33 through the head 77 and operating pin 78 individual thereto having the inclined inner end surface 81 engaging either one of the races 83*a–e* or the surface of the cam plate 33 as the case may be. Then it is necessary to rotatably mount the multiple race cam 33 on the other switch plate 40. Because of manufacturing tolerances some leeway is required in the operating mechanism for the switch blades 55. This is provided by the resilient mounting of each of the contacts 50.

The manner in which the ratchet wheel 88 is advanced in step by step fashion together with the multiple race cam 33 now will be described, particular reference being had to FIGURES 6, 7 and 8 of the drawings. For illustrative purposes the ratchet wheel 88 is shown with seventy-two teeth 89 on its periphery. A larger or smaller number of ratchet teeth can be employed as may be desired.

Referring now particularly to FIGURE 7 it will be observed that the reference character 106 is applied to a motor shaft which is driven by the motor 18 at a constant speed. Fast on the motor shaft 106 is a apinion 107 that is arranged to drive a reduction gear train which is indicated, generally, at 108. The gear train 108 includes a gear **108*a* and a pinion 108*b* which are mounted for conjoint rotation on a shaft 108*c* that extends forwardly from the back plate 19. The gear 108*a* meshes with the teeth of the pinion 107 and the teeth of the pinion 108*b* mesh with the teeth of a gear 108*d* which is mounted for conjoint rotation with a pinion 108*e* on a shaft 108*f* that projects forwardly from the back plate 19. The pinion 108*e* meshes with the teeth of a gear 108*g* that is mounted for conjoint rotation with a pinion 108*h* on a shaft 108*i* that extends forwardly from the back plate 19. The pinion 108*h* drives a gear 109 which is rotatably mounted on a shaft 110 that projects forwardly from the back plate 19. Mounted for conjoint rotation with the gear 109 and between it and the back plate 19 is a double lobed cam 111. It will be understood that the motor 18 drives the double lobed cam 111 through the reduction gear train 108 in the direction indicated by the arrow 112**.

The double lobed cam 111 is arranged to advance the ratchet wheel 88 two steps for each complete rotation of the cam 111. For this purpose the cam 111 is provided with two eccentric arcuate cam surfaces 113 which terminate in generally radially extending drop off surfaces 114 and are arranged to engage a cam follower 115 which is provided with a vertically extending portion **115*a* for riding downwardly over one or the other of the drop off surfaces 114 and a horizontally extending portion 115*b* that is arranged to ride near its right end along the respective arcuate cam surface 113. The drop off surfaces 114 are slightly inclined to control the return speed of the indexing lever 116. For example, the angle of inclination may be such as to require about two seconds to return under the force of the indexing spring 120. This delay is employed to prevent breakage of the operating pins 78 by avoiding a snap action thereof. The cam follower 115 is formed integrally with and extends forwardly from an indexing lever 116 which is provided with a laterally extending arm 117 that is pivotally mounted on a pin 118 which extends forwardly from the back plate 19. It will be understood that, as the double lobed cam 111 is rotated at a constant speed in the direction indicated by the arrow 112, FIGURE 7, the cam follower 115 will ride along one or the other of the eccentric arcuate cam surfaces 113 and thereby retract the indexing lever 116 a corresponding distance and in the direction indicated by the arrow 119 in FIGURE 6. At the end of the stroke when the cam follower 115 rides downwardly over one or the other of the drop off surfaces 114, the indexing lever 116 is advanced by an indexing spring 120 to effect a corresponding advance of the ratchet wheel 88. As shown in FIGURE 6 one end of the indexing spring 120 is secured to an anchor pin 121 which extends forwardly from the back plate 19. The other end of the indexing spring 120 is secured to an anchor pin which extends forwardly from the sector shaped portion of the indexing lever 116. The sector shaped portion of the indexing lever 116 is guided for movement along the front side of the backplate 19 by a lug 123 which is struck from the back plate 19 and overlies the upper right portion of the indexing lever 116**.

Referring now particularly to FIGURE 8, the manner in which the indexing lever 116 is operatively connected to the ratchet wheel 88 will be noted. It will be recalled that the sector shaped portion of the indexing lever 116 is reciprocated over the front face of the back plate 19 through the interaction of the cam follower 115 with the double lobed cam 111 and the indexing spring 120. In FIGURE 8 the rear side of a portion of the indexing lever 116 appears through a slotted opening 125 in the back plate 19. In this slotted opening 125 there is provided an indexing pawl 126 which is pivoted on a pin 127 that extends rearwardly from the indexing lever 116.

It is important that the extent of advance of the ratchet wheel 88 for each step be accurately limited. For accomplishing this stop washer 128 is carried by the pin 127 and it is arranged to engage a stop shoulder 129 which forms one end of the slotted opening 125. When the stop washer 128 engages the stop shoulder 129, no further advance of the ratchet wheel 88 can take place under the influence of the indexing spring 120. The position of the cam follower 115, FIGURE 7, corresponds to the position of the stop washer 128 in engagement with the stop shoulder 129, FIGURE 8, at the end of one step of advance of the ratchet wheel 88. The outer end portion of the sector shaped part of the indexing lever 116 is offset forwardly so that the body portion of the indexing pawl 126 is offset slightly forwardly from the front face of the back plate 19. This permits the stop washer 128 to register with the stop shoulder 129. Extending rearwardly from the indexing pawl 126 and through the slotted opening 125 is an indexing tooth or detent 130 the lower edge of which is arranged to engage one of the teeth 89 on the ratchet wheel 88. The retracted position of the indexing tooth or detent 130 is shown by broken lines in FIGURE 8. The indexing tooth or detent 130 is operated to this position by movement of the indexing lever 116 in the direction indicated by the arrow 119. Then, as the cam follower 115 moves downwardly over one or the other of the drop off surfaces 114, the indexing spring 120 advances the indexing lever 116 and therewith the indexing pawl 126 and the indexing tooth 130 carried thereby. A corresponding advance of the ratchet wheel 88 in the direction indicated by the arrow 131 takes place through an extent of one tooth.

It is desired that the ratchet wheel 88 be held against reverse rotation. For this purpose a holding pawl 132 is provided. The holding pawl 132 is rockably mounted on the rear side of the back plate 19 by means of a lug 133 which is struck up therefrom. The holding pawl 132 overlies the rear surface of the back plate 19 and is provided with a rearwardly extending holding tooth or detent 134 that engages one of the teeth 89 of the ratchet wheel 88 and thus prevents rotation thereof in the direction opposite to that indicated by the arrow 131.

It is desirable that the indexing tooth or detent 130 and the holding tooth or detent 134 be biased toward the ratchet wheel 88 in order to ratchet past the ratchet teeth 89. For this purpose in accordance with this invention a pawl spring 135 in the form of a piece of resilient wire is employed and it is common to both of the teeth or detents 130 and 135. As shown in FIGURE 8 one end 136 of the pawl spring 135 overlies the indexing tooth or detent 130. The intermediate portion 137 extends through an annular groove 138 near the outer end of the pin 127. It will be understood that the pawl spring 135 reacts against the pin 127. The other end 139 of the pawl spring 135 overlies the holding tooth or detent 134. In this manner a single spring, i.e., the pawl spring 135, reacting against the pin 127 acts to bias the indexing tooth or detent 130 and the holding tooth or detent 134 toward the ratchet wheel 88.

Figure 13:
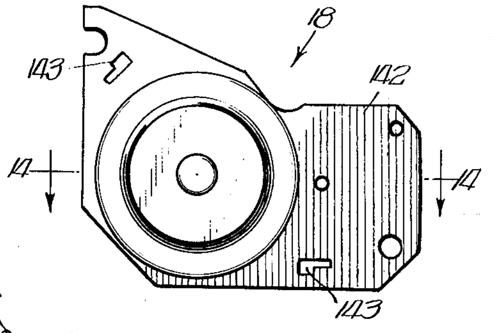
FIGURE 13 is an elevational view of the motor and mounting plate.

The details of construction of the motor 18 are shown more clearly in FIGURES 13–20 of the drawings to which reference now will be had. In FIGURE 13 it will be noted that the motor 18 is mounted on a flat mounting plate 142 that is formed of suitable magnetic material.

Openings 143 are provided therein for positioning on lugs 144, FIGURE 6, which extend forwardly from the back plate 19.

Figures 14, 15, 16, 17, 18, 19, 20:
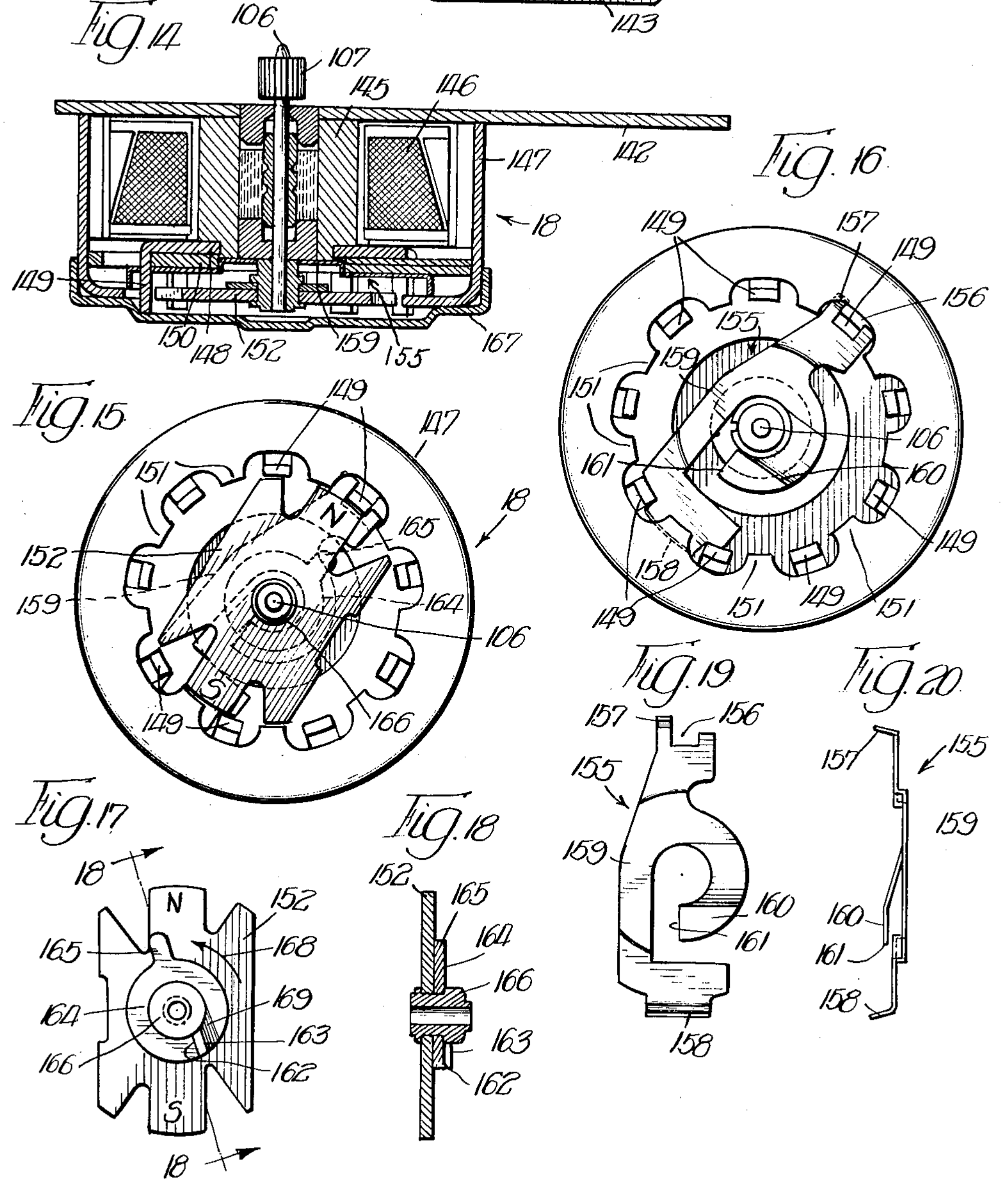
FIGURE 14 is a horizontal sectional view taken generally along the line 14—14 of FIGURE 13.
FIGURE 15 is an elevational view of the motor shown in FIGURE 14 with the cover removed.
FIGURE 16 is a view, similar to FIGURE 15, with the rotor removed to show the mechanism employed for preventing rotation thereof in the reverse direction to more than one revolution.
FIGURE 17 is a view, in rear elevation, of the rotor shown in FIGURE 15.
FIGURE 18 is a sectional view taken generally along the line 18—18 of FIGURE 17.
FIGURE 19 is a plan view of the rotor reversing spring.
FIGURE 20 is a view, in side elevation, of the rotor reversing spring shown in FIGURE 19.

FIGURE 14 shows the motor 18 in cross section and it will be understood that the details of construction generally are those of the motor shown in U.S. Patent No. 2,793,307, issued May 21, 1957, modified for use with the present invention. The motor 18 includes a central magnetic core 145 which is surrounded by a coil 146 to which the leads 46, previously referred to, are connected. It will be understood that the leads 46 are connected to a suitable source of 110 volt 60 cycle alternating current. Surrounding the coil 146 is an annular case 147 of magnetic material. One end of the magnetic core 145 is connected through the mounting plate 142 to one end of the annular case 147. The other end of the magnetic core 145 is provided with a pole piece 148 having pole tips 149 which extend generally parallel to the shaft 106 and, as shown in FIGURE 15, are positioned along a circle. The pole tips 149 are held in proper relation by a guide 150 formed of suitable non-magnetic material. Cooperating with and spaced from the pole tips 149 on the pole piece 148 are radially inwardly extending pole tips 151 that are formed integrally with the annular case 147. The alternating magnetic field that is generated between the pole tips 149 and 151 is applied to a rotor 152 of the permanent magnet type and serves to cause it to rotate at a predetermined synchronous speed.

The motor 18 can drive the gear train 108 and parts associated therewith only in one direction. However, there is the possibility that the rotor 152 may stop in such a position that, when the coil 146 is next energized with alternating current, the rotor 152 may start to rotate in the wrong direction. In accordance with this invention provision is made for preventing reverse rotation of the rotor 152 through more than one revolution. The advantage of this construction is that a minimum of movement of the gear train 108 takes place when the rotor 152 is prevented from rotating through more than one revolution in comparison to the rotation which might take place if means were provided along the gear train 108 for preventing such reverse rotation.

With a view to preventing the reverse rotation of the rotor 152 to more than one revolution while not interfering with rotation in the correct direction, a rotor reversing spring, shown generally at 155 in FIGURES 19 and 20, is provided. Its application to the motor 18 is shown in FIGURE 16 where the rotor 152 has been removed. The rotor reversing spring 155 generally is formed of a strip of flat spring metal and is slotted at one end as indicated at 156 for receiving one of the pole tips 149 as shown in FIGURE 16. An upstanding tip 157 is provided adjacent one side of the slot 156 to locate this end of the reversing spring 155 and hold it in proper position. At the other end of the reversing spring 155 there is formed a flange 158 which interfits between two adjacent pole tips 149. The flange 158 also serves to locate this end of the spring 155. The central body portion 159 of the spring 155 overlies the adjacent end of the magnetic core 145, as seen in FIGURE 14, and is provided with an arcuate spring detent 160 an edge 161 of which is arranged to engage a shoulder 162, FIGURES 17 and 18, of a pawl 163 that is formed in a pawl member 164 that overlies the face of the permanent magnet rotor 152 which looks toward the coil 146. A locating lug 165 is formed integrally with the pawl member 164, which preferably is formed of a suitable plastic insulating material, for assembly purposes. It will be observed in FIGURE 18 that the permanent magnet rotor 152 and the pawl member 164 are securely mounted on a hub 166 which is telescoped over the end of the shaft 106 away from the pinion 107 and is suitably secured thereto for rotation therewith. A cover 167, FIGURE 14, overlies the annular case 147 and the rotor 152. As long as the rotor 152 continues to rotate in the direction indicated by the arrow 168 in FIGURE 17, the spring detent 160 merely rides over an inclined cam surface 169 on the pawl member 164 leading to the shoulder 162. However, should the rotor 152 start in the opposite direction, such rotation continues only until the shoulder 162 on the pawl member 164 engages the edge 161 of the spring detent 160. Because of the resiliency of the spring detent 160, it is stressed by such action and its reaction is sufficient to drive the rotor 152 in the opposite or correct direction of rotation indicated by the arrow 168. Since the edge 161 of the spring detent 160 is located in the path of the shoulder 162 on reverse rotation of the rotor 152, the latter can rotate in the reverse direction through not more than one complete revolution before the reversing operation takes place in the manner described.

In the construction described hereinbefore it will be recalled that the operating shaft 20 which is arranged to be manually rotated, is also arranged for endwise movement as shown in FIGURE 5 for moving the switch blade 36 from the closed to the open circuit position. The shaft 20 is held in one or the other of its endwise positions by a hairpin spring 26 the arms 25 of which cooperate with one or the other of annular grooves 24. The hairpin spring 26 is mounted on the front side of the back plate 19 and the annular grooves 24 are located adjacent the back plate 19. While this construction is satisfactory, it is remote from the front plate 14.

Figure 21:
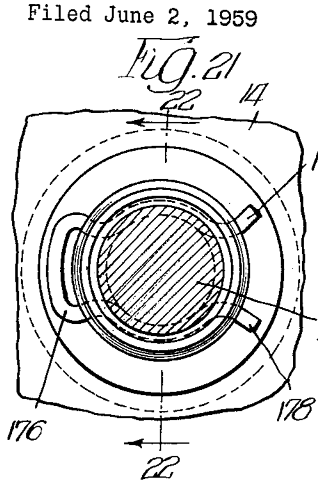
FIGURE 21 is a view taken generally along the line 21—21 of FIGURE 5 and showing an alternate form of construction for holding the shaft in one or the other of its endwise operated positions.
Figure 22:
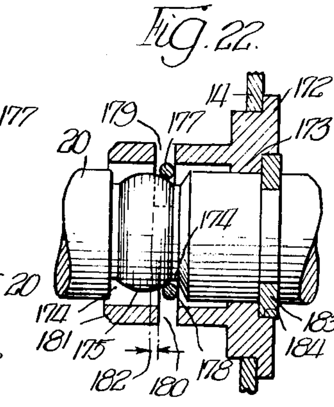
FIGURE 22 is a vertical sectional view taken generally along the line 22—22 of FIGURE 21 and showing the shaft in the inner position.
Figure 23:
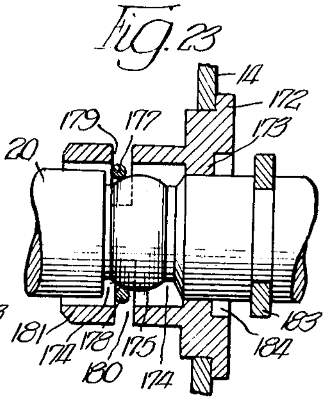
FIGURE 23 is a view, similar to FIGURE 22, but showing the shaft in the outer position.

It is desirable that the mechanism which holds the shaft 20 in one or the other of its endwise positions be mounted on the front plate 14 to provide somewhat greater stability and ease in operation. Such an arrangement is shown in FIGURES 21, 22 and 23 of the drawings. Here the retaining means is mounted closer to the dial 11 which is mounted on the right end of the shaft 20 as it appears in FIGURES 22 and 23.

The construction shown in FIGURES 21, 22 and 23 employs a bushing 172 which is secured to the front plate 14 and has a bearing portion 173 for the shaft 20. The bushing 172 extends rearwardly from the front plate 14 and overlies a pair of annular grooves 174 in the shaft 20 which are interconnected by an arcuate shoulder portion 175 of the shaft 20. In order to hold the shaft 20 in one or the other of its endwise operated positions, a clip spring 176 of a hairpin shape, FIGURE 21, is employed. The clip spring 176 has resilient arms 177 and 178 which register respectively with slots 179 that are located in a cylindrical portion 181 of the bushing 172. The slots 179 and 180 are offset as indicated at 182 in FIGURE 22 sufficiently to permit the arms 177 and 178 to engage the right sides of the offset slots 179 and 180 when the shaft 20 is moved inwardly through the full extent. When the shaft 20 is moved outwardly through the full extent, the offset relationship of the slots 179 and 180 permits the arms 177 and 178 to engage the left sides of the slots 179 and 180 and to hold the shaft 20 securely in this position. The movement of the shaft 20 inwardly or toward the left is limited by a ring 183 that is arranged to enter an annular recess 184 in the bushing 172.

It will be understood that the construction for holding the shaft 20 in either of its endwise positions as shown in FIGURES 21, 22 and 23, can be substituted for the construction shown in FIGURE 5 with the remainder of the circuit controller 12 being constructed otherwise as previously described.

Figure 24:
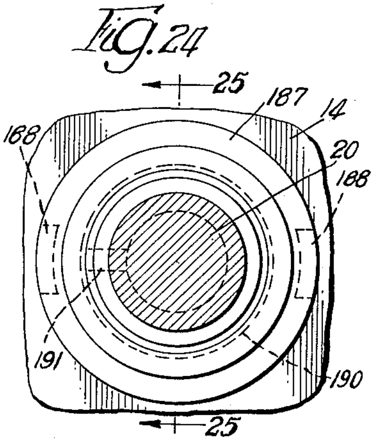
FIGURE 24 is a view, similar to that shown in FIGURE 21, but showing still another construction for holding the shaft in one or the other of its endwise operated positions.
Figure 25:
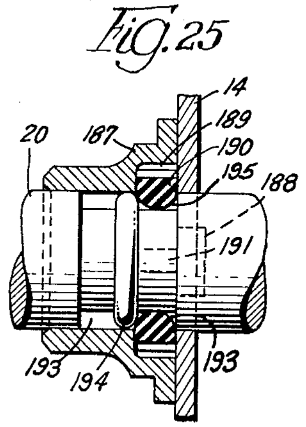
FIGURE 25 is a vertical sectional view taken generally along the line 25—25 of FIGURE 24.
Figure 26:
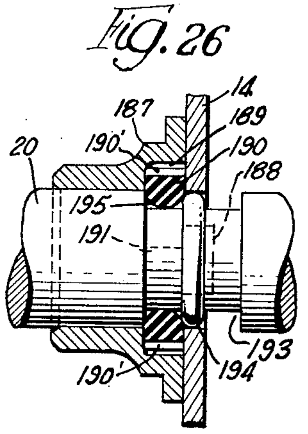
FIGURE 26 is a view, similar to FIGURE 25, but showing the shaft in the other endwise operated position.
Figure 26A:
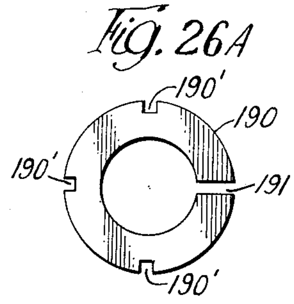
FIGURE 26A is a plan view of the resilient washer employed in the construction shown in FIGURES 24, 25 and 26.

FIGURES 24, 25 and 26 show another arrangement for holding the operating shaft 20 in one or the other of its endwise positions. Here it will be noted that a bushing 187 is mounted on the front plate 14 through the provision of staking ears 188 which project through the front plate 14. The bushing 187 is telescoped over the shaft 20 and it will be understood that it moves endwise therethrough, being journaled on the front plate 14 and also on the left end of the bushing 187. The bushing 187 adjacent the rear side of the front plate 14 is provided with an annular groove 189 for receiving a resilient washer 190, FIGURE 26A, that may be formed of a suitable plastic material having a low coefficient of friction. The washer 190 is split, as indicated at 191, and is arranged to interfit with either of two annular grooves 193 that are spaced apart along the shaft 20 with an annular rib 194 therebetween having an arcuate surface. The diameter of each groove 193 is less than the diameter of the rib 194. The inner surface of the washer 190 is rounded as indicated at 195 to facilitate sliding over the annular rib 194 as the operating shaft 20 is moved endwise from one position to the other. The washer 190 has spaced peripheral notches 190′ which provide the desired degree of flexibility and yet leave sufficient material to provide for bearing against the outer surfaces of the grooves 193 to limt endwise movement of the shaft 20. FIGURE 25 shows the shaft 20 moved to the left to a position where the switch blade 36 is moved out of engagement with the stationary contact 57. When the shaft 20 is moved endwise to the right, the annular rib 194 radially outwardly deforms the washer 190 into the outer portion of the annular groove 189. Then the inherent resilience of the washer 190 causes it to interfit with the annular groove 193 in the shaft 20 when it occupies the position shown in FIGURE 26 where the switch blade 36 makes contact with the stationary contact 57. It will be understood that the construction shown in FIGURES 24, 25 and 26 can be substituted in the circuit controller 12 as shown in FIGURE 5 and described hereinbefore in lieu of the hairpin 26 and parts associated therewith.

Figure 27:
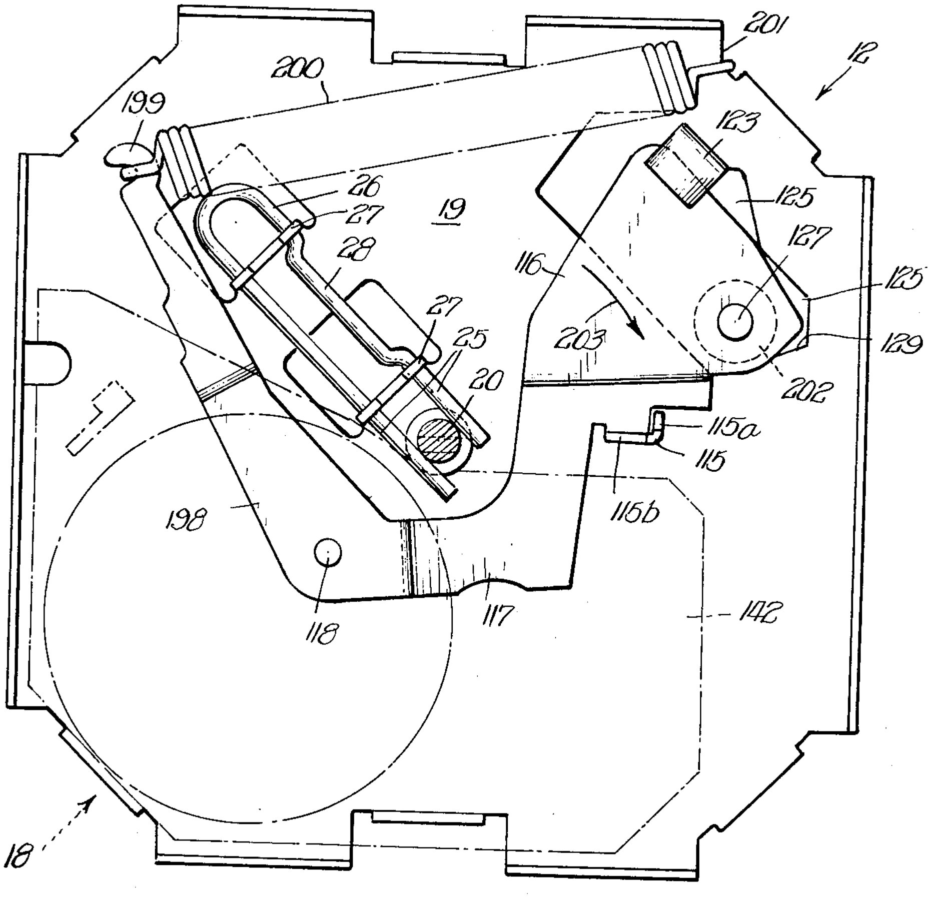
FIGURE 27 is an elevational view, similar to FIGURE 6, and showing a modified construction particularly with respect to the manner in which the indexing lever operating spring is connected thereto.

FIGURE 27 shows a modification of the construction of the indexing lever 116 for advancing the ratchet wheel 88. Here it will be observed that the construction is generally similar to that shown in FIGURE 6 and described hereinbefore except for the positioning of the indexing spring 120. In FIGURE 27 it will be noted that an indexing lever arm 198 is formed integrally with the arm 117 of the indexing lever 116 and extends laterally therefrom at the pivot axis 118. The distal end of the indexing lever arm 198 is provided with a hook 199 for receiving one end of an indexing spring 200 the other end of which is anchored over an edge of the back plate 19 as indicated at 201. By providing the indexing lever arm 198 in the relationship shown, it is possible to employ for the indexing spring 200 a spring having a larger diameter and thereby providing a more uniform load for a given displacement than is possible with the spring 120.

The construction and operation of the indexing lever 116 as shown in FIGURE 27 are otherwise the same as for the indexing lever 116 shown in FIGURE 6 and previously described. It is unnecessary to provide the anchor pin 122. The pin 127 has a head 202 at the rear end which is arranged to engage the stop shoulder 129 at the end of the slotted opening 125 to provide a stop for the movement of the indexing lever 116 in the advancing direction indicated by the arrow 203. It will be understood that the indexing pawl 126 and holding pawl 132 are provided on the rear side of the back plate 19 for cooperation with the ratchet wheel 88 in the manner heretofore described.

Since certain further changes can be made in the foregoing constructions and different embodiments of the invention can be made without departing from the spirit and scope thereof, it is intended that all matter shown in the accompanying drawings and described hereinbefore shall be interpreted as illustrative and not in a limiting sense.

What is claimed as new is:

1. A circuit controller comprising, in combination, a pair of switch plates disposed in parallel spaced relation along an axis, contacts on the juxtaposed sides of said plates in arcuate spaced relation along circles the centers of which lie along said axis, switch blades extending radially of said axis and movably mounted at their inner ends between said plates with their outer ends aligned with certain of said contacts for engaging and disengaging them, spring means urging said switch blades away from one switch plate toward the other switch plate, and means on said other switch plate for selectively moving said switch blades toward said one switch plate.

2. A circuit controller comprising, in combination, a pair of switch plates disposed in parallel spaced relation along an axis, contacts on the juxtaposed sides of said plates in arcuate spaced relation along circles the centers of which lie along said axis, flat switch blades extending radially of said axis between said plates with the flat sides perpendicular thereto and their outer ends aligned with certain of said contacts for engaging and disengaging them, the inner ends of said flat switch blades being transversely apertured and pivotally mounted on protuberances extended thereinto from pairs of spaced conducting lugs carried by one switch plate, spring means urging said switch blades away from said one switch plate toward the other switch plate, and means on said other switch plate for selectively moving said switch blades toward said one switch plate.

3. A circuit controller comprising, in combination, a pair of switch plates disposed in parallel spaced relation along an axis, contacts on the juxtaposed sides of said plates in arcuate spaced relation along circles the centers of which lie along said axis, flat switch blades extending radially of said axis between said plates with the flat sides perpendicular thereto and their outer ends aligned with certain of said contacts for engaging and disengaging them, the contact engaging portion of each flat switch blade being in the form of a flat contact plate extending endwise therefrom and perpendicular thereto, the inner ends of said flat switch blades being transversely apertured and pivotally mounted on protuberances extending thereinto from pairs of spaced conducting lugs carried by one switch plate, spring means urging said switch blades away from said one switch plate toward the other switch plate, and means on said other switch plate for selectively moving said switch blades toward said one switch plate.

4. A circuit controller comprising, in combination, a pair of switch plates disposed in parallel spaced relation along an axis, contacts on the juxtaposed sides of said plates in arcuate spaced relation along circles the centers of which lie along said axis, flat switch blades extending radially of said axis between said plates with the flat sides perpendicular thereto and their outer ends aligned with certain of said contacts for engaging and disengaging them, the contact engaging portion of each flat switch blade being a rivet extending transversely through an integral extension of each switch blade at right angles thereto, the inner ends of said flat switch blades being transversely apertured and pivotally mounted on protuberances extending thereinto from pairs of spaced conducting lugs carried by one switch plate, spring means urging said switch blades away from said one switch plate toward the other switch plate, and means on said other switch plate for selectively moving said switch blades toward said one switch plate.

5. A circuit controller comprising, in combination, a pair of switch plates disposed in parallel spaced relation along an axis, contacts on the juxtaposed sides of said plates in arcuate spaced relation along circles the centers of which lie along said axis, switch blades extending radially of said axis and hinged at their inner ends between said plates with their outer ends aligned with certain of said contacts for engaging and disengaging them, spring means urging said switch blades away from one switch plate toward the other switch plate, an operating pin operatively engaging at one end each switch blade and extending transversely of and slidable on said other switch plate parallel to said axis, and means for selectively engaging the other end of each operating pin to move the same toward or permit its movement away from said one switch plate under the influence of the respective spring means to effect corresponding movement of the respective switch blade.

6. A circuit controller comprising, in combination, a pair of switch plates disposed in parallel spaced relation along an axis, contacts on the juxtaposed sides of said plates in arcuate spaced relation along circles the centers of which lie along said axis, switch blades extending radially of said axis and hinged at their inner ends between said plates with their outer ends aligned with certain of said contacts for engaging and disengaging them, spring means urging said switch blades away from one switch plate toward the other switch plate, each switch blade having an operating force receiving portion intermediate its ends located along a circle the center of which lies along said axis, an operating pin individual to each switch blade and extending transversely of and slidable on said other switch plate parallel to said axis and located along a circle the center of which lies along said axis and which has a diameter different from the diameters of the circles along which the other operating pins are located, a head at one end of each pin extending radially therefrom to engage the operating force receiving portion of the respective switch blade, and means for selectively engaging the other end of each operating pin to move the same toward or permit its movement away from said one switch plate under the influence of the respective spring means to effect corresponding movement of the respective switch blade.

7. A circuit controller comprising, in combination, a pair of switch plates disposed in parallel spaced relation along an axis, contacts on the juxtaposed sides of said plates in arcuate spaced relation along circles the centers of which lie along said axis, switch blades extending radially of said axis and pivotally mounted at their inner ends between said plates with their outer ends aligned with certain of said contacts for engaging and disengaging them, spring means urging said switch blades away from one switch plate toward the other switch plate, each switch blade having an operating force receiving portion intermediate its ends located along a circle the center of which lies along said axis, an operating pin individual to each switch blade and extending transversely of and slidable on said other switch plate parallel to said axis and located along a circle the center of which lies along said axis and which has a diameter different from the diameters of the circles along which the other operating pins are located, a head at one end of each pin extending radially therefrom to engage the operating force receiving portion of the respective switch blade, a cam plate in parallel juxtaposed relation to said other switch plate on the side away from said one switch plate, means rotatably mounting said cam plate about said axis, a cam race on said cam plate individual to each operating pin and located along the circle along which it is located for engaging the other end thereof, and means for rotating said cam plate to cause each cam race selectively to engage the respective other end of each operating pin to move the same toward or permit its movement away from said one switch plate under the influence of the respective spring means to effect corresponding movement of the respective switch blade.

8. A circuit controller comprising, in combination, a pair of switch plates disposed in parallel spaced relation along an axis, contacts on the juxtaposed sides of said plates in arcuate spaced relation along circles the centers of which lie along said axis, switch blades extending radially of said axis and pivotally mounted at their inner ends between said plates with their outer ends aligned with certain of said contacts for engaging and disengaging them, spring means urging said switch blades away from one switch plate toward the other switch plate, each switch blade having an operating force receiving portion intermediate its ends located along a circle the center of which lies along said axis, an operating pin individual to each switch blade and extending transversely of and slidable on said other switch plate parallel to said axis and located along a circle the center of which lies along said axis and which has a diameter different from the diameters of the circles along which the other operating pins are located, a head at one end of each pin extending radially therefrom to engage the operating force receiving portion of the respective switch blade, a cam plate in parallel juxtaposed relation to said other switch plate on the side away from said one switch plate, means rotatably mounting said cam plate about said axis, a cam race on said cam plate individual to each operating pin and located along the circle along which it is located for engaging the other end thereof, force applied by said spring means being transmitted through said switch blades and operating pins individual thereto and reacting against said cam plate, spring means reacting against said cam plate in a direction opposite to and in excess of the force applied thereto by the first mentioned spring means, and means for rotating said cam plate to cause each cam race selectively to engage the respective other end of each operating pin to move the same toward or permit its movement away from said one switch plate under the influence of the respective spring means to effect corresponding movement of the respective switch blade.

9. A circuit controller comprising, in combination, a pair of switch plates disposed in parallel spaced relation along an axis, contacts on juxtaposed sides of said plates in arcuate spaced relation along circles the centers of which lie along said axis, a resilient support for each contact on one switch plate, a stationary support for each contact on the other switch plate, switch blades extending radially of said axis and hingedly mounted at their inner ends between said plates on said one switch plate with their outer ends aligned with certain of said contacts for engaging and disengaging them, an operating spring individual to each switch blade and reacting between it and said one switch plate to urge it toward each other switch plate, and means on said other switch plate for selectively moving said switch blades toward said one switch plate and into and out of engagement with the respective contacts.

10. A circuit controller comprising, in combination, a pair of switch plates disposed in parallel spaced relation along an axis, contacts on juxtaposed sides of said plates in arcuate spaced relation along circles the centers of which lie along said axis, a resilient support for each contact on one switch plate, a stationary support for each contact on the other switch plate, switch blades extending radially of said axis and pivotally mounted at their inner ends between said plates on said one switch plate with their outer ends aligned with certain of said contacts for engaging and disengaging them, an operating spring individual to each switch blade and reacting between it and said one switch plate to urge it toward said other switch plate, an operating pin operatively engaging at one end each switch blade and extending transversely of and slidable on said other switch plate parallel to said axis, each operating pin being located along a circle the center of which lies along said axis and which has a diameter different from the diameters of the circles along which the other operating pins are located, a cam plate in parallel juxtaposed relation to said other switch plate on the side away from said one switch plate, means rotatably mounting said cam plate about said axis, a cam race on said cam plate individual to each operating pin and located along the circle along which it is located for engaging the other end thereof, and means for rotating said cam plate to cause each cam race selectively to engage the respective other end of each operating pin to move the same toward or permit its movement away from said one switch plate under the influence of the respective operating spring to effect corresponding movement of the respective switch blade.

11. A circuit controller comprising, in combination, a pair of switch plates disposed in parallel spaced relation along an axis, contacts on juxtaposed sides of said plates in arcuate spaced relation along circles the centers of which lie along said axis, a resilient support for each contact on one switch plate, a stationary support for each contact on the other switch plate, switch blades extending radially of said axis and pivotally mounted at their inner ends between said plates on said one switch plate with their outer ends aligned with certain of said contacts for engaging and disengaging them, an operating spring individual to each switch blade and reacting between it and said one switch plate to urge it toward said other switch plate, each switch blade having an operating force receiving portion intermediate its ends located along a circle the center of which lies along said axis, an operating pin individual to each switch blade and extending transversely of and slidable on said other switch plate parallel to said axis and located along a circle the center of which lies along said axis and which has a diameter different from the diameters of the circles along which the other operating pins are located, a head at one end of each pin extending radially therefrom to engage the operating force receiving portion of the respective switch blade, and means for selectively engaging the other end of each operating pin to move the same toward or permit its movement away from said one switch plate under the influence of the respective operating spring to effect corresponding movement of the respective switch blade, said resilient support being flexed when the respective switch blade is moved toward said one switch plate on engagement of its operating force receiving portion by the respective head, each head being movable away from said one switch plate and out of operative engagement with the respective switch blade whereby each switch blade engages the respective contact on said other switch plate under the full force of the respective operating spring.

12. A circuit controller comprising, in combination, a pair of switch plates disposed in parallel spaced relation along an axis, contacts on juxtaposed sides of said plates in arcuate spaced relation along circles the centers of which lie along said axis, a resilient support for each contact on one switch plate, a stationary support for each contact on the other switch plate, switch blades extending radially of said axis and pivotally mounted at their inner ends between said plates on said one switch plate with their outer ends aligned with certain of said contacts for engaging and disengaging them, an operating spring individual to each switch blade and reacting between it and said one switch plate to urge it toward said other switch plate, an operating pin operatively engaging at one end each switch blade and extending transversely of and slidable on said other switch plate parallel to said axis, each operating pin being located along a circle the center of which lies along said axis and which has a diameter different from the diameters of the circles along which the other operating pins are located, a cam plate in parallel juxtaposed relation to said other switch plate on the side away from said one switch plate, means rotatably mounting said cam plate about said axis, a cam race on said cam plate individual to each operating pin and located along the circle along which it is located for engaging the other end thereof, forces applied by said operating springs being transmitted through the respective switch blades and operating pins and reacting against said cam plate except for the switch blade engaging its contact on said other switch plate, a spring reacting against same cam plate along said axis in a direction opposite to and in excess of the forces applied thereto at any time by said operating springs, and means for rotating said cam plate to cause each cam race selectively to engage the respective other end of each operating pin to move the same toward or permit its movement away from said one switch plate under the influence of the respective spring means to effect corresponding movement of the respective switch blade.

13. A circuit controller comprising, in combination, a pair of switch plates disposed in parallel spaced relation along an operating axis, contacts on the juxtaposed sides of said plates in arcuate spaced relation along circles the centers of which lie along said operating axis, switch blades extending radially of said operating axis and pivotally mounted at their inner ends between said plates with their outer ends aligned with certain of said contacts for engaging and disengaging them, spring means urging said switch blades away from one switch plate toward the other switch plate, an operating pin operatively engaging at one end each switch blade and extending transversely of and slidable on said other switch plate parallel to said operating axis, a cam plate in parallel juxtaposed relation to said other switch plate on the side away from said one switch plate, means rotatably mounting said cam plate about said operating axis, cam race means on said cam plate engageable with the other ends of said operating pins, and means for rotating said cam plate to cause said cam race means selectively to engage the other ends of said operating pins to move the same toward or permit movement thereof away from said one switch plate under the influence of the respective spring means to effect corresponding movement of the respective switch blades.

14. The invention, as set forth in claim 7, wherein the other end of each pin has an inclined surface to engage a correspondingly inclined surface at the leading end of the respective cam race to facilitate the movement of the pin individual thereto for moving its switch blade against the biasing action of the spring means.

15. A circuit controller comprising, in combination, a pair of switch plates disposed in parallel spaced relation along an operating axis, contacts on the juxtaposed sides of said plates in arcuate spaced relation along circles the centers of which lie along said operating axis, switch blades extending radially of said operating axis and pivotally mounted at their inner ends between said plates with their outer ends aligned with certain of said contacts for engaging and disengaging them, spring means urging said switch blades away from one switch plate toward the other switch plate, an operating pin operatively engaging at one end each switch blade and extending transversely of and slidable on said other switch plate parallel to said operating axis, a cam plate in parallel juxtaposed relation to said other switch plate on the side away from said one switch plate, means rotatably and slidably mounting said cam plate about and along said operating axis, cam race means on one side of said cam plate engageable with the other ends of said operating pins, spring means reacting aganist the other side of said cam plate to urge it toward said other switch plate and constituting the sole support of said cam plate against movement along said operating axis away from said other switch plate, and means for rotating said cam plate to cause said cam race means selectively to engage the other ends of said operating pins to move the same toward or permit movement thereof away from said one switch plate under the influence of the respective spring means to effect corresponding movement of the respective switch blades.

16. A circuit controller comprising, in combination, a pair of switch plates disposed in parallel spaced relation along an operating axis, contacts on the juxtaposed sides of said plates in arcuate spaced relation along circles the centers of which lie along said operating axis, switch blades extending radially of said operating axis and pivotally mounted at their inner ends between said plates with their outer ends aligned with certain of said contacts for engaging and disengaging them, spring means urging said switch blades away from one switch plate toward the other switch plate, an operating pin operatively engaging at one end each switch blade and extending transversely of and slidable on said other switch plate parallel to said operating axis, a cam plate in parallel juxtaposed relation to said other switch plate on the side away from said one switch plate, means rotatably mounting said cam plate about said operating axis, cam race means on said cam plate engageable with the other ends of said operating pins, a manually rotatable shaft endwise slidably and non-rotatably mounted along said operating axis on said cam plate for rotating the same to cause said cam race means selectively to engage the other ends of said operating pins, and switch means between said other switch plate and said cam plate operable solely by endwise movement of said manually rotatable shaft unaccompanied by movement of said cam plate.

References Cited in the file of this patent

UNITED STATES PATENTS

| | | |
|---|---|---|
| 1,849,403 | Jefferson | Mar. 15, 1932 |
| 2,285,210 | Kempton | June 2, 1942 |
| 2,483,831 | Illian | Oct. 4, 1949 |
| 2,501,431 | Ausman et al. | Mar. 21, 1950 |
| 2,606,237 | Chase | Aug. 5, 1952 |
| 2,619,557 | Illian | Nov. 25, 1952 |
| 2,703,347 | Constantine | Mar. 1, 1955 |
| 2,747,056 | Jefferson | May 22, 1956 |
| 2,869,375 | Lewis | Jan. 20, 1959 |
| 2,877,317 | Euler et al. | Mar. 10, 1959 |
| 2,906,328 | Wantz | Sept. 29, 1959 |
| 2,913,913 | Weber | Nov. 24, 1959 |
| 2,939,025 | Williford | May 31, 1960 |
| 2,939,336 | Hetzer | June 7, 1960 |